United States Patent
Shah et al.

(10) Patent No.: US 10,788,803 B2
(45) Date of Patent: Sep. 29, 2020

(54) SYSTEM AND METHOD FOR MAINTAINING BUILDING AUTOMATION SYSTEM PERFORMANCE

(71) Applicant: SIGNIFY HOLDING B.V., Eindhoven (NL)

(72) Inventors: Parikshit Shah, White Plains, NY (US); Maulin Dahyabhai Patel, Tuckahoe, NY (US); Sirisha Rangavajhala, Wakefield, MA (US); Saeed Reza Bagheri, Croton, NY (US); Yao-Jung Wen, Concord, CA (US); Jianfeng Wang, Ossining, NY (US); Weiran Nie, Shanghai (CN)

(73) Assignee: SIGNIFY HOLDING B.V., Eindhoven (NL)

(\*) Notice: Subject to any disclaimer, the term of this patent is extended or adjusted under 35 U.S.C. 154(b) by 0 days.

(21) Appl. No.: 15/306,071

(22) PCT Filed: Apr. 21, 2015

(86) PCT No.: PCT/IB2015/052891
§ 371 (c)(1),
(2) Date: Oct. 21, 2016

(87) PCT Pub. No.: WO2015/162549
PCT Pub. Date: Oct. 29, 2015

(65) Prior Publication Data
US 2017/0038753 A1    Feb. 9, 2017

Related U.S. Application Data
(60) Provisional application No. 61/984,075, filed on Apr. 25, 2014.

(51) Int. Cl.
G05B 19/048 (2006.01)
G05B 15/02 (2006.01)
H05B 47/10 (2020.01)

(52) U.S. Cl.
CPC ........... *G05B 19/048* (2013.01); *G05B 15/02* (2013.01); *H05B 47/10* (2020.01); *G05B 2219/25011* (2013.01); *G05B 2219/2642* (2013.01)

(58) Field of Classification Search
CPC ................. G05B 19/048; G05B 15/02; G05B 2219/25011; G05B 2219/2642; H05B 37/0209
(Continued)

(56) References Cited

U.S. PATENT DOCUMENTS 7,664,573 B2   2/2010  Ahmed
2003/0236866 A1* 12/2003 Light .................... G01S 5/0221
                                                        709/220
(Continued)

FOREIGN PATENT DOCUMENTS

CN      103168278 A    6/2013
EP       2602677 A1    6/2012
(Continued)

OTHER PUBLICATIONS

Thiago H. Silva et al, "Uncovering Properties in Participatory Sensor Networks", Universidade Federal de Minas Gerais—UFMG, Computer Science, Belo Horizonte, Brazil.
(Continued)

*Primary Examiner* — Ziaul Karim
(74) *Attorney, Agent, or Firm* — Daniel J. Piotrowski

(57) ABSTRACT

A system and method for maintaining a system configuration to provide desired system performance is disclosed. The system comprises a processing unit receiving sensor data
(Continued)

associated with environmental conditions within an area, generating a map of the area based on the received sensor data, determining a change in the map of the area and determining at least one system commissioning parameter associated with the determined change in the map to compensate for or correct the change in the map. In one aspect of the invention, the sensor data is provided through a plurality of mobile devices.

18 Claims, 6 Drawing Sheets

(58) Field of Classification Search
USPC .......................................................... 700/275
See application file for complete search history.

(56) References Cited

U.S. PATENT DOCUMENTS

| | | | |
|---|---|---|---|
| 2006/0074494 A1 | 4/2006 | McFarland | |
| 2008/0244104 A1* | 10/2008 | Clemente | H04L 12/40013 710/11 |
| 2009/0009339 A1* | 1/2009 | Gorrell | G06Q 30/02 340/573.1 |
| 2009/0009340 A1* | 1/2009 | Weaver | G01D 21/00 340/573.1 |
| 2009/0196206 A1* | 8/2009 | Weaver | H01Q 21/205 370/310 |
| 2011/0115816 A1 | 5/2011 | Brackney | |
| 2012/0215446 A1 | 8/2012 | Schunder et al. | |
| 2012/0239202 A1 | 9/2012 | Voysey | |
| 2013/0046847 A1 | 2/2013 | Zavesky et al. | |
| 2013/0085609 A1* | 4/2013 | Barker | G05B 15/02 700/276 |
| 2013/0141223 A1* | 6/2013 | Brandsma | G06K 7/01 340/10.51 |
| 2013/0310987 A1* | 11/2013 | Sobek | F24F 11/00 700/276 |
| 2014/0266669 A1* | 9/2014 | Fadell | G05B 19/042 340/501 |
| 2015/0061859 A1* | 3/2015 | Matsuoka | G08B 27/00 340/501 |
| 2015/0382153 A1* | 12/2015 | Otis | H04W 4/043 455/456.2 |

FOREIGN PATENT DOCUMENTS

| | | |
|---|---|---|
| EP | 2602985 A1 | 6/2013 |
| EP | 2615561 A1 | 7/2013 |
| EP | 2615801 A1 | 7/2013 |
| JP | 2005533302 A | 11/2005 |
| JP | 2010123483 A | 6/2010 |
| JP | 2010257755 A | 11/2010 |
| JP | 2013073751 A | 4/2013 |
| WO | 2012143814 A | 10/2012 |

OTHER PUBLICATIONS

Elsa Macias et al, "Mobile Sensing Systems", Sensors 2013, 13, pp. 17292-17321, doi:10.3390/s131217292, ISSN 1424-8220.

Eleanor S Lee et al, "Daylighting the New York Times Headquarters Building, Final Report: Commissioning Daylighting Systems", Lawrence Berkeley National Laboraty, Berkeley, CA.

* cited by examiner

SYSTEM AND METHOD FOR MAINTAINING BUILDING AUTOMATION SYSTEM PERFORMANCE

CROSS-REFERENCE TO PRIOR APPLICATIONS

This application is the U.S. National Phase application under 35 U.S.C. § 371 of International Application No. PCT/IB2015/052891, filed on Apr. 21, 2015, which claims the benefit of U.S. Provisional Application No. 61/984,075, filed on Apr. 25, 2014. These applications are hereby incorporated by reference herein.

The present application relates to the field of energy service and more particularly to a system and method of maintaining desired building performance during its lifecycle.

Building management systems (BMS) or building automation systems (BAS) provide control of building subsystems such as lighting and HVAC (heating, ventilation and air-conditioning). The control system improves a building's efficiency and its occupant's comfort via control programming, e.g., daylight harvesting via light sensors. The purpose of building commissioning is to establish and verify the control programming so that building subsystems work correctly and efficiently.

Current building energy system commission parameters are usually fixed at the construction or post-occupancy phase of the facility. The commissioning parameters are typically optimized under certain conditions and assumptions at the time of construction or during the post-occupancy phase. Over a period of time, the facility functionality, user behavior, preferences and/or environment may change, and the initial commission parameters of the system become sub-optimal. The current practice of re-commissioning is manually carried out by people and is labor-intensive. Furthermore, the re-commissioning usually lags behind the time when the system performance is compromised, resulting in unnecessary user dissatisfaction.

As an example, assuming a task illuminance on a desk at 500 lux is desired. As it would be impractical to have a sensor directly installed on a desk (as it will be blocked by the user), ceiling sensors that measure illuminance on the ceiling may be installed. The ceiling illuminance is then calibrated to estimate the task illuminance on the desk. Given the staff working schedule, this calibration has some parameters that are set during initial commissioning of the lighting control system. However, over a period of time the working schedule and other conditions may change. And the commissioning parameters set during initial commissioning are no longer optimal; making the estimation inaccurate and the light dimming function undesirable.

To this end, data collection and visualization of indoor environmental quantities, such as temperature and illumination, are important for the purposes of validating performance. Traditional data collection systems involve the installation of physical sensors in fixed spatial locations that measure data associated with temperature and/or illumination, for example. These traditional sensors include thermal sensors, such thermometers to measure temperature, and light intensity sensors (often based on photodiodes) to measure illumination level of a space as well as occupancy sensors to detect the presence of people in the indoor space.

However, fixed sensors are expensive to install, require replacement in case of failure, and may be obstructed by changes in the location.

Hence, there is a need in the industry for a system and method for maintaining optimized building performance.

It is the objective of the invention to collect the building performance data in inexpensive manner.

It is the object of the invention to provide a system that maintains a desired performance associated with an area.

It is the object of the invention to determine changes in the environment of an area and determine changes in parameters of a system to maintain a desired performance.

It is the object of the invention to compensate for and correct changes in the environment of an area.

In one aspect of the invention a system for maintaining a building system commissioning to provide desired system performance is disclosed. The system comprises a processing unit receiving sensor data associated with environmental conditions within an area, generating a map of the area based on the received sensor data, determining a change in the map of the area and determining at least one system commissioning parameter associated with the determined change in the map to compensate for or correct the change in the map. In one aspect of the invention, the sensor data is provided through crowd sourcing using commercially available mobile devices.

In one aspect of the invention, sensor input data may be provided through fixed sensors within the area or by mobile devices that may be temporally located within the area during a time period. The mobile devices may provide sensor data when the mobile device determines that the mobile device is positioned in a manner that provides a clean measurement.

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the accompanying drawings.

It is noted that the drawings of the invention are not to scale. The drawings are intended to depict only typical aspects of the invention, and therefore should not be considered as limiting the scope of the invention. In the drawings, like numbers represent like elements between the drawings.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such elements is not provided herein. The disclosure herein is directed also to variations and modifications known to or recognized by those skilled in the art based on the discussion herein.

Figure 1:
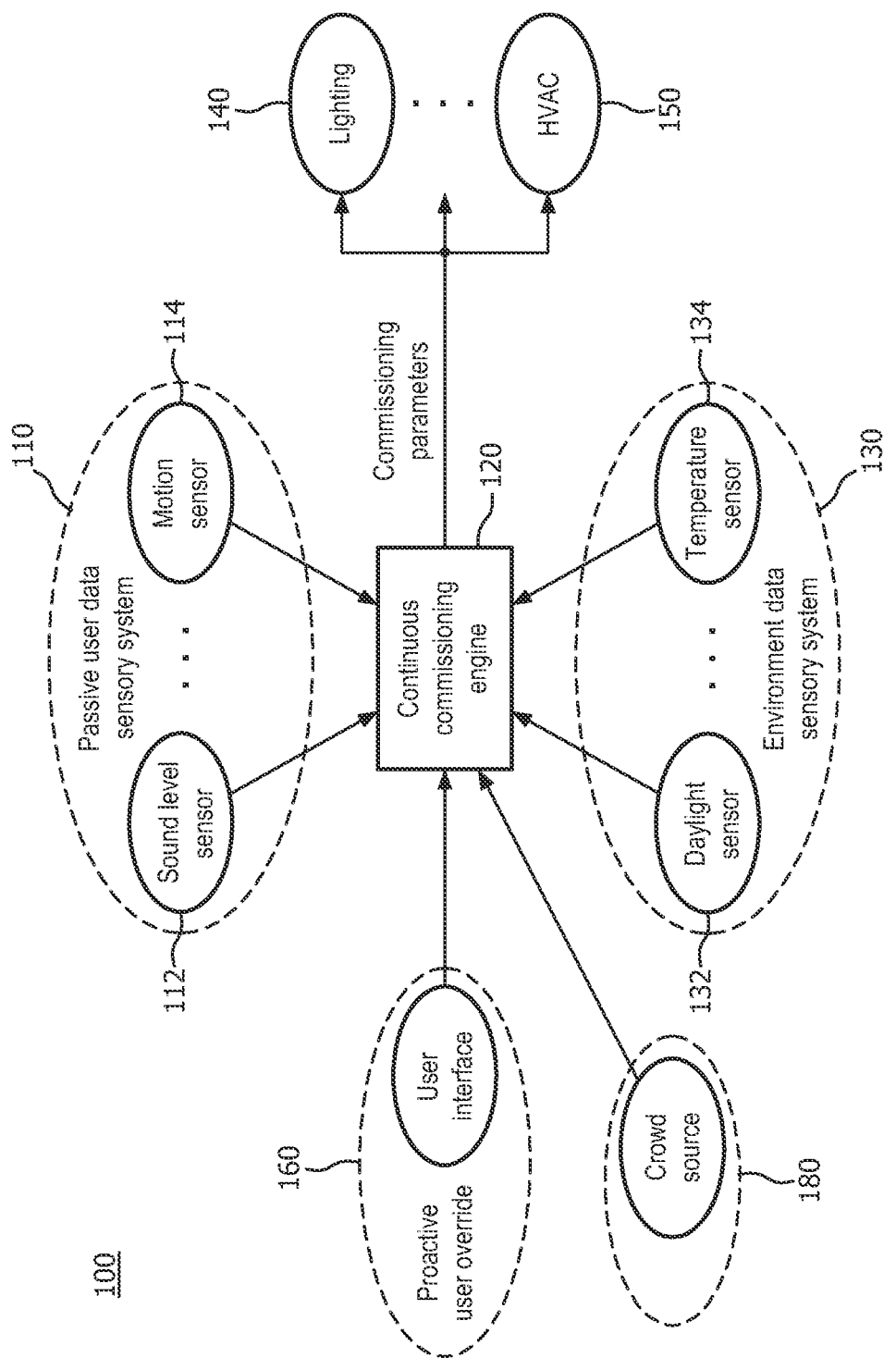
FIG. 1 illustrates an exemplary system in accordance with the principles of the invention.

FIG. 1 illustrates an exemplary data collection and building commissioning system 100 in accordance with the principles of the invention. In the exemplary system illustrated, at least one passive user data sensor element 110 provides information into a commissioning engine 120. Each of these devices (i.e., data sensor element 110) may provide information regarding a space or area where the device is located. The sensor element(s) 110 may represent one or more of a sound level sensor 112 and a motion sensor 114, for example. Other sensors may also be included within the environmental data sensory system 110, but have not been shown to avoid obfuscating the invention claimed.

The commissioning engine 120 may further receive inputs from an environment data sensory system 130. The environmental data sensory system 130 may include at least one of a daylight monitoring sensor 132 and a temperature sensor 134. Other sensors may also be included within the environmental data sensory system 130, but have not been shown to avoid obfuscating the invention claimed. Environmental data includes both indoor and outdoor environment parameters that are independent of user behavior or preference. Such environmental parameters may include floor/wall reflectance, daylight level, wind level, ambient temperature, air pressure, etc. The commissioning engine 120 may further receive user data from one or more users through an interface 160. User data regarding user behavior and/or preference, can be further divided into two types of data; Passive user data that reflects the objective user behavior, including a number of occupants, working hours, activity-level (in terms of sound, motion), etc., and proactive user data that overrides or changes set point control parameters. For example, overriding luminaire dim level, air conditioner temperature, AC fan speed, shade angle, etc. This type of data can be readily collected from the user panels (i.e., interface 160) and/or sensors installed on respective energy systems. Common sensor types such as occupancy sensor, motion sensor, sound-level sensor, video cameras, temperature sensor, wind level sensor, daylight sensor, etc., may be used to collect passive and/or active user data.

In one aspect of the invention, information may be collected from one or more persons, (i.e., crowd-source), at block 180, wherein each of the one or more persons may operate or have in their possession a data sensor element. For example, each of the one or more persons may have in their possession a cellular telephone, a personal digital assistant, a laptop computer, a tablet computer, etc. that may be used to collect data associated with a lighting condition, and/or a temperature, for example.

Crowd-sourcing has been proposed as a solution concept for a variety of applications where a difficult and/or time-consuming task is distributed to a large number of participants, and in which each participant assumes responsibility for a small portion of the task. For instance, crowd-sourcing has been proposed in the difficult task of labelling large image-data sets (a task that is easily and more reliably done by people than by computer automation). In the context of data-collection, the idea of crowd-sourcing has been examined in the context of image and video collection and for weather data collection in outdoor environments.

The outputs of the commissioning engine 120 may then be provided to appliances or equipment, such as lighting, 140 and/or air-conditioning 150 and other system devices (not shown).

In one aspect of the invention, the commission parameters for a lighting system (140) may include, but are not limited to, light/occupancy sensor placement and orientation, controller-to-luminaire mapping, wherein a controller can control illuminance level, correlated with color temperature (CCT), light beam orientation, light distribution, duty cycle (i.e., on and off period), occupancy-based controller hold-on period, etc. Commission parameters for an HVAC system (150) include temperature sensor placement and orientation, motor speed, operating frequency, ventilation level, duty cycle, refrigerant level, etc.

Figure 2:
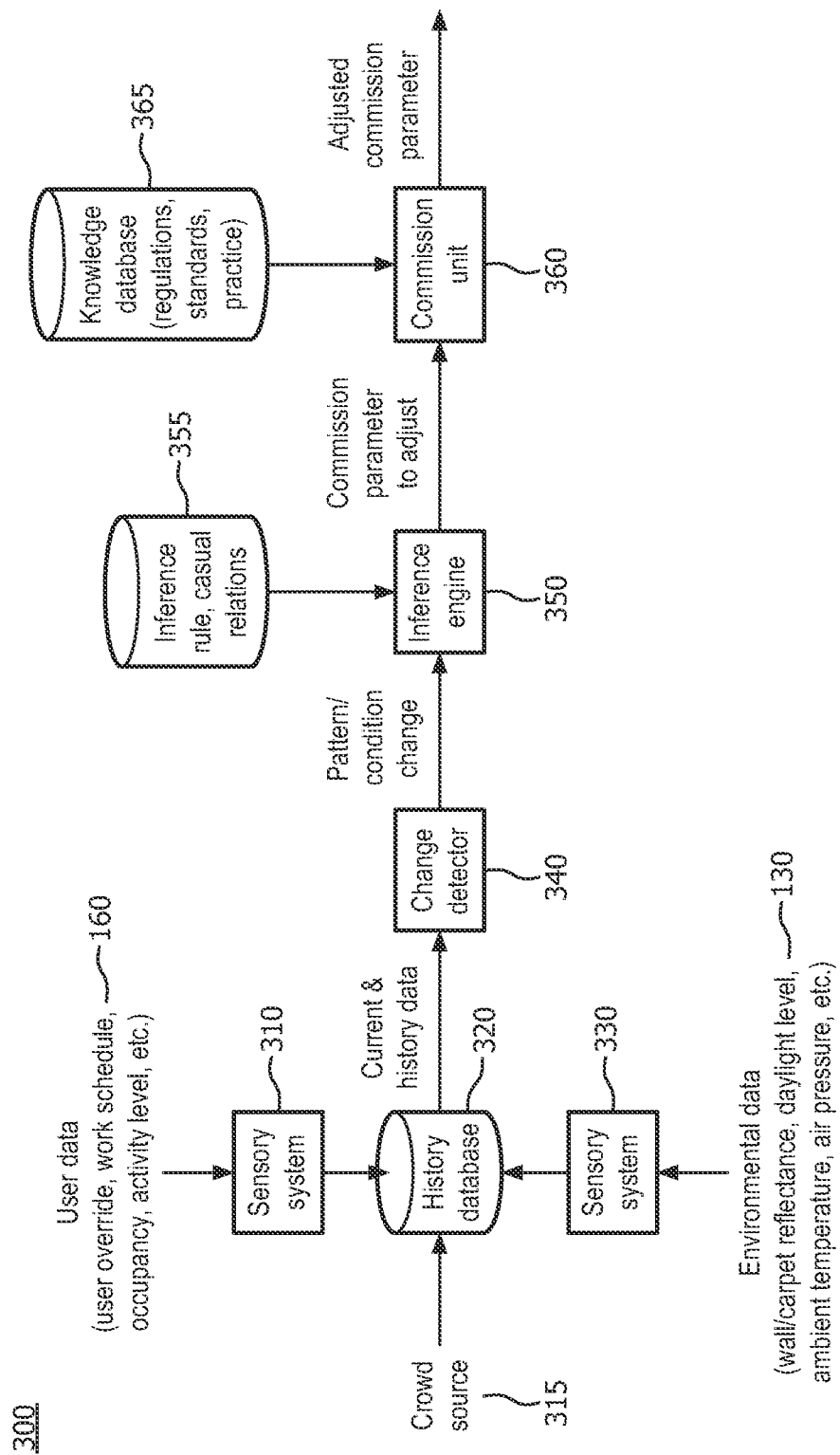
FIG. 2 illustrates a block diagram of an exemplary system in accordance with the principles of the invention.

FIG. 2 illustrates a further aspect of the invention 100 shown in FIG. 1.

In this illustrated aspect of the system 300, user data 160 may be determined by corresponding sensors within a sensory system 310. As discussed, the user data may also be collected by independent sensors, which monitor the user behavior and/or the environment surrounding the user. The user data 160 is then provided to a history database 320 for collection, collation and storage.

Similarly, user based sensors that are associated with a user (e.g., a smart cellular telephone, a smart watch, a key FOB, etc.), may be collected through crowd sourcing, 315.

Similarly, environmental data 130 may be determined by an appropriate (fixed) sensor 330. The environmental data may represent lighting, temperature, air pressure, daylight conditions, etc. The environmental data 130 is also provided to the data base 320 for collection, correlation and storage.

The collected data, both historical and current (e.g., within a time period) is provided to change detector system 340. The change detector system 340 analyzes the user and environment data both temporally (compare current and history data) and spatially (compare data from different areas) to identify a significant and consistent change in user and/or the environment data, using data analytics and pattern recognition techniques. For example, is a lighting condition currently sensed (over a finite period of time) significantly different than the historical data. Or is the lighting in one room significantly different than lighting in another, adjacent, room during a same time period. In one aspect of the invention, a change in the order of ten (10) percent may be considered a significant difference. It would be appreciated that the value (i.e., a threshold) used in determining a significant difference may be varied, without altering the scope of the invention. In addition, the threshold value may be different for each different commissioning parameter and/or sensed element type.

The indication of a change (time or spatially) in one or both of the user and environmental data may be provided to inference engine 350. The inference engine 350 associates the change in user/environment data with at least one commission parameter that caused the change or should be adapted to compensate for the determined change. The association can be made based on inference rules, causal relation analysis, etc., which are provided by an associated database 355.

The at least one commission parameter that caused the detected change or should be adapted to compensate for the change is then provided to a commission unit 360. A commission unit 360 determines the value of the commission parameter to be adapted or specific commission actions that should be taken, based on a knowledge database 365 that stores regulation, standard and best practices, etc. For example, regulations may represent governmental requirements or internal policies regarding heating and/or lighting. Similarly, standards may represent industry wide agreements.

Figure 3:
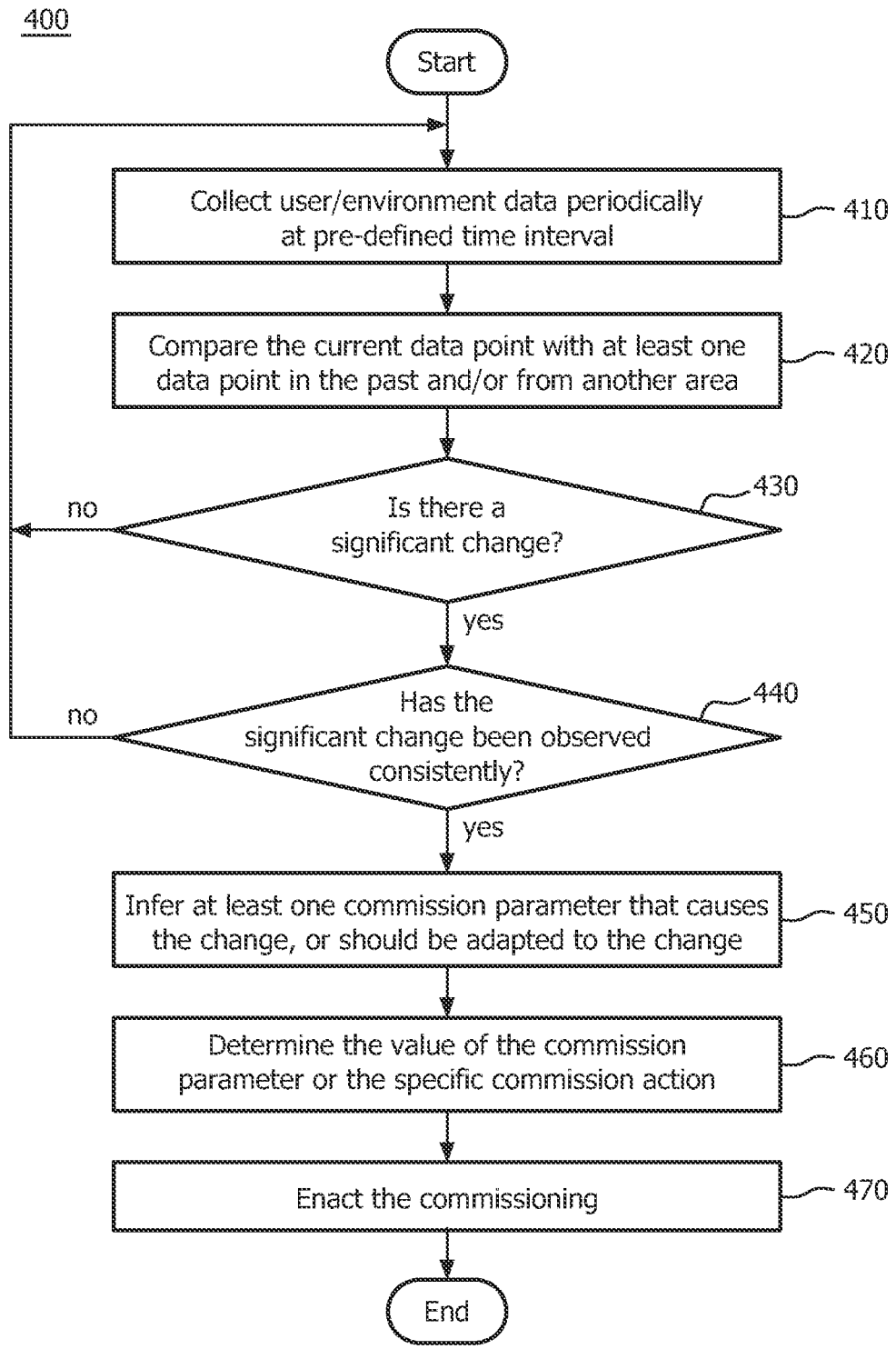
FIG. 3 illustrates a flow chart of an exemplary process in accordance with the principles of the invention.

In one aspect of the invention, the commissioning engine can be offered as a maintenance service to a client as a follow-up sale after an energy conservation measures have been commissioned, as will be discussed FIG. 3 illustrates a flowchart 400 of an exemplary process in accordance with the principles of the invention.

At block 410, user data and environmental data are collected. Such collection may be performed asynchronously and/or periodically. For example, samples may be collected by polling individual sensors or the samples may be received when a sensor detects a change (e.g., motion sensing). In another aspect the sensor may determine that a clean sample may not be obtainable and, thus, not provide a sample when requested or expected. At block 420, the current samples (or data points) may be compared with corresponding previously collected and saved samples or data points (i.e., historical database 320). At block 430, a determination is made whether a significant change from the historical data has been detected. If a significant change has been detected, then a determination is made whether the change is a consistent change (i.e., not a one-time occurrence) at block 440. For example, the processing may take further samples over a known period of time to determine whether the detected change is consistent. At block 450, an inference is made regarding one or more parameters that may cause the change or should be adapted to compensate for the change.

At block 460, a value of the inferred commission parameter is determined or a specific action is taken. At block 470, the value of the commission parameter is outputted and/or the required action is taken.

To build the mathematical notation, the following simple representation is considered. Let t denote the time and $A_j$ ($1 \leq j \leq M$) denote the $j^{th}$ area of the facility. Parameters $p_0, \ldots, p_K$ are the commission parameters for at least one building energy subsystem (e.g., lighting, HVAC). An example commission parameter list is illustrated as:

$p_0$: lighting illuminance level,
$p_1$: correlated color temperature, ...,
$p_{K-1}$: duty cycle, $p_K$: AC refrigerant level.

Using notation of $p(t,A_j)$ to indicate that each commission parameter is the function of both area and time.

The notation $u_0, \ldots, u_M$ is used to denote the user data parameters that are collected through the building sensory system. User data can include both passive user data and proactive user overrides. User override can be expressed in terms of a delta ($\Delta$) value from the setpoint value with signs. For example, +200 lux, −3° C. When there is no user override, its value is simply +0. An example parameter list is illustrated as follows, indicating whether the parameter is passive or proactive:

$u_0$: indoor sound level (passive),
$u_1$: indoor motion level (passive),
$u_3$: number of occupants (passive),
$u_4$: active time period (passive), ...,
$u_{M-1}$: lighting dim level user override (proactive),
$u_M$: AC temperature user override (proactive)

The notation of $u(t,A_j)$ is used to indicate that each user data parameter is the function of both area and time.

The notation $s_0, \ldots, s_L$ is used to denote the environmental data parameters that are collected through the building sensory system. An example parameter list is illustrated as:

$s_0$: wall reflectance,
$s_1$: floor reflectance, ...,
$s_{L-1}$: daylight level, $s_L$: humidity level The notation of $s(t,A_j)$ is used to indicate that each environmental parameter is the function of both area and time.

In one embodiment of the invention, the change detector 340 compares the current data point (or a plurality of current data points) from an area with at least one previous data point from the same area. The previous data point can be adjacent to the current data point on the time axis, or separated from the current data point by a time interval. For example, a Tuesday data point can be compared with a Monday data point, or compared with the data point from last Tuesday.

In one embodiment of the invention, the change detector 340 compares the current data point in area $A_i$ with at least a data point in a different area $A_j$ ($i \neq j$) to identify a change. More generally, the change detector can analyze data both temporally and spatially.

In one embodiment, a facility manager defines a significant change by setting up a constant threshold value for each type of user/environment data. Using $u_0$ as an example, a significant change is defined if the following condition is satisfied:

$$u_0(t_0,A_i)-u_0(t_1,A_j) \geq Th_{u_0},\ t_0>t_1,\ 1\leq i,j \leq M$$

The notation of different subscripts of i and j indicates that a significant change may also be defined based on data points from different areas. A facility manager can then define a consistent change by setting up a constant threshold value on a number of times a same or similar change occurs during a known time period. Hereafter, we will simply use the term "change" for "significant and consistent change" if no confusion arises.

In one embodiment, the inference engine 350 associates the change in one passive user data parameter with at least one commission parameter that should or could be the source of the change or adapted in view of the change.

As an example, consider a scenario where an area of a library previously used for reading/studying is converted into an inquiry desk.

In one aspect of the invention, the inference engine 350 stores two pieces of domain knowledge:
1) a list of pre-defined room functionality in a library and their respective characteristic user activity levels (in term of motion and sound);
2) the list of pre-defined room functionality and their desired lighting parameters in terms of illuminance and color temperature.

Using this knowledge, on detection of the significant change in user motion-level and/or sound-level, for example, the commission engine may suggest or recommend changes of the room functionality. In one aspect of the invention, the commission engine may determine that the commission parameters may be changed to automatically reduce the light level to save energy and/or use a warmer and more encouraging color temperature for the inquiry desk setting.

In one embodiment, the inference engine 350 associates the change in one user override parameter with at least one commission parameter that should be adapted to change.

For example, consider a building that implements a schedule-based lighting scheme during working hours and an occupancy-based lighting scheme during off-hours. The schedule-based lighting maintains 100% illuminance level during working hours, i.e., 8:00 am-6:00 pm. During off-hours, the occupancy-based lighting scheme maintains 80% illuminance level when motion is detected and turns the illuminance level to 30% when no motion is detection for 5 minute (hold-on time). During a known time period, a department's engineers need to work overtime (e.g., from 6:00 pm to 9:00 pm) and the pre-set scheduled based lighting is frequently overridden, by the users, to increase the light level to 100% during this time period. The inference engine 350 has the following inference rules:

1. task lighting typically uses 100% of light level;
2. the period of schedule-based lighting should match the period when task lighting is required.

By detecting frequent user overrides (demand for 100% task lighting) during 6:00 pm to 9:00 pm, the inference engine is able to infer the extended tasking lighting requirement beyond normal working hours and find a mismatch between the period of schedule-based lighting's and the period when task lighting is demanded. The inference engine 350 may then make the decision of extending the period of schedule-based lighting for an extra 3 hours, saving user override efforts and complaints in the future. Similarly, when the overtime work is stopped and there is less motion detected in the area between the 6 PM to 9 PM time period, then inference engine may determine that that a change in the commissioning parameters is necessary to adapt to the changed conditions.

In another embodiment, the inference engine 350 infers and verifies at least one commission parameter that causes the change in one user override parameter. Consider in a certain floor of an office building, the temperature of an air-conditioner is continuously set lower than the average user temperature setting during a heating season. The inference engine 350 may operate using exemplary inference rules, such as:

1. Excessive number of occupants→AC temperature decreased by user.
2. Direct sunlight exposure→AC temperature decreased by user
3. Lowered refrigerant level→AC temperature decreased by user Based on the exemplary inference rules, the inference engine may issue further queries to the sensory system to verify the root cause of the change caused by the user override. If no abnormal data in occupancy or indoor sunlight level can be correlated with the change in user override, the inference engine can issue a maintenance alarm about refrigerant replacement to the facility manager.

In another embodiment, the inference engine 350 associates a change in one environment data parameter with at least one commission parameter that should be adapted to the change. For example, consider a building where lighting parameters (light level, color temperature) are initialized according to the wall and floor reflectance when the building is first put in use. After some time, the floor or wall reflectance may change (e.g. due to re-painting, or carpet change, etc.). The inference engine 350 may use a piece of domain knowledge (or rule) such as "if the surface reflectance changes, the desired lighting parameters should change accordingly". The change in surface reflectance level can be automatically detected by a video camera installed within the building, using image processing techniques. The mapping between different surface reflectance level and desired lighting parameters can be drawn from expert knowledge and used by the commission unit to adjust these parameters.

Figure 4:
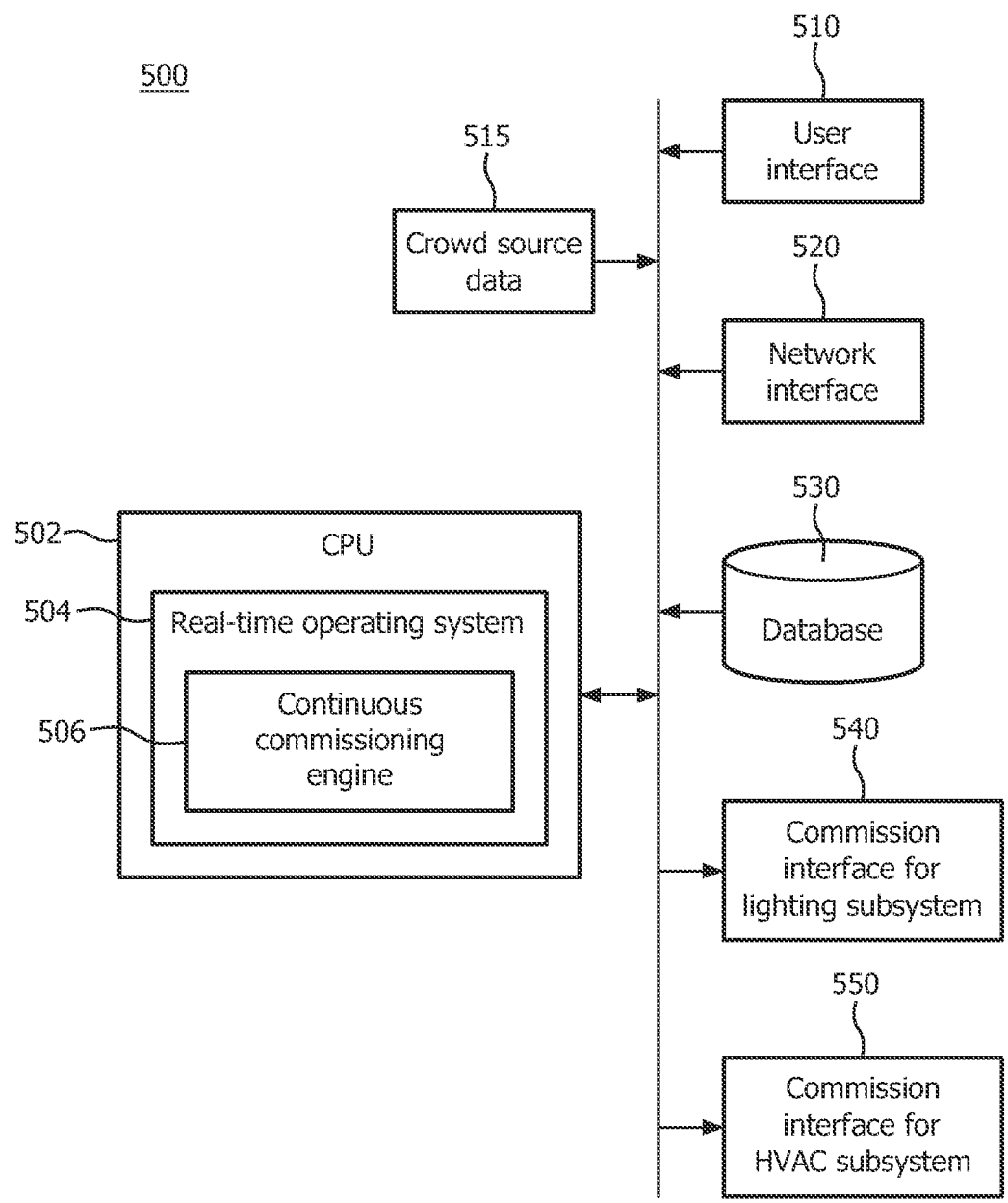
FIG. 4 illustrates an exemplary system for performing the processing shown herein.

FIG. 4 illustrates an exemplary system configuration 500 in accordance with the principles of the invention.

System 500 includes a central processing unit (CPU) or computer or processor, which includes a real-time operating system that is used to provide instruction (i.e., software or code) to the CPU to manage the execution of the processing shown herein. The real-time operating system may be a proprietary operating system or a commercially available operating system (e.g., Linux, Windows, etc.). The continuous commissioning engine 506 may be a software module that executes computer code, which causes the CPU to perform the processing steps described herein.

The system 500 further includes a user interface 510 that may be used to input data samples, as previously described, or user inputs for manually commissioning parameters. The system may further receive inputs 515 from crowd source elements, as previously discussed. Also illustrated is network interface 520. Network interface 520 may be used to input environmental sensor data or may be used to input parameters or data to CPU 502. Network interface 520 may further be used to provide outputs (i.e., changes) from CPU 502. Data base 530 may be used to collect, collate and sort data samples. The system 500 may further include an interface 540 that enables CPU 502 to provide commission data to a lighting system and/or an interface 550 that enables CPU 502 to provide commission data to a HVAC system.

In one aspect of the invention, the system 500 consists of a mobile electronic device (block 515) that contains one or more sensors that are relevant to sensing the physical quantities of interest (e.g., lighting, temperature). In one embodiment, the sensors can be manually turned on by the user when the user wishes to do so. In other embodiments, the mobile devices may automatically detect whether its sensor is physically ready for taking a clean measurement. In one embodiment, the mobile electronic device is a cellular phone, and the physical readiness for obtaining a clean sample can be determined by detecting whether the phone is currently in use. For example, if the phone (or device) is in close proximity to a person's body, the phone or device may be deemed unready for clean sensor measurement. On the other hand, if the phone is being used to write a text message or playing a game or simply resting on the work surface it is farther away from the user's person and it may be considered in a state that is suitable to collect a measurement. More generally the mobile device can automatically detect, from its use, whether it is suitable to take a measurement.

Figure 5:
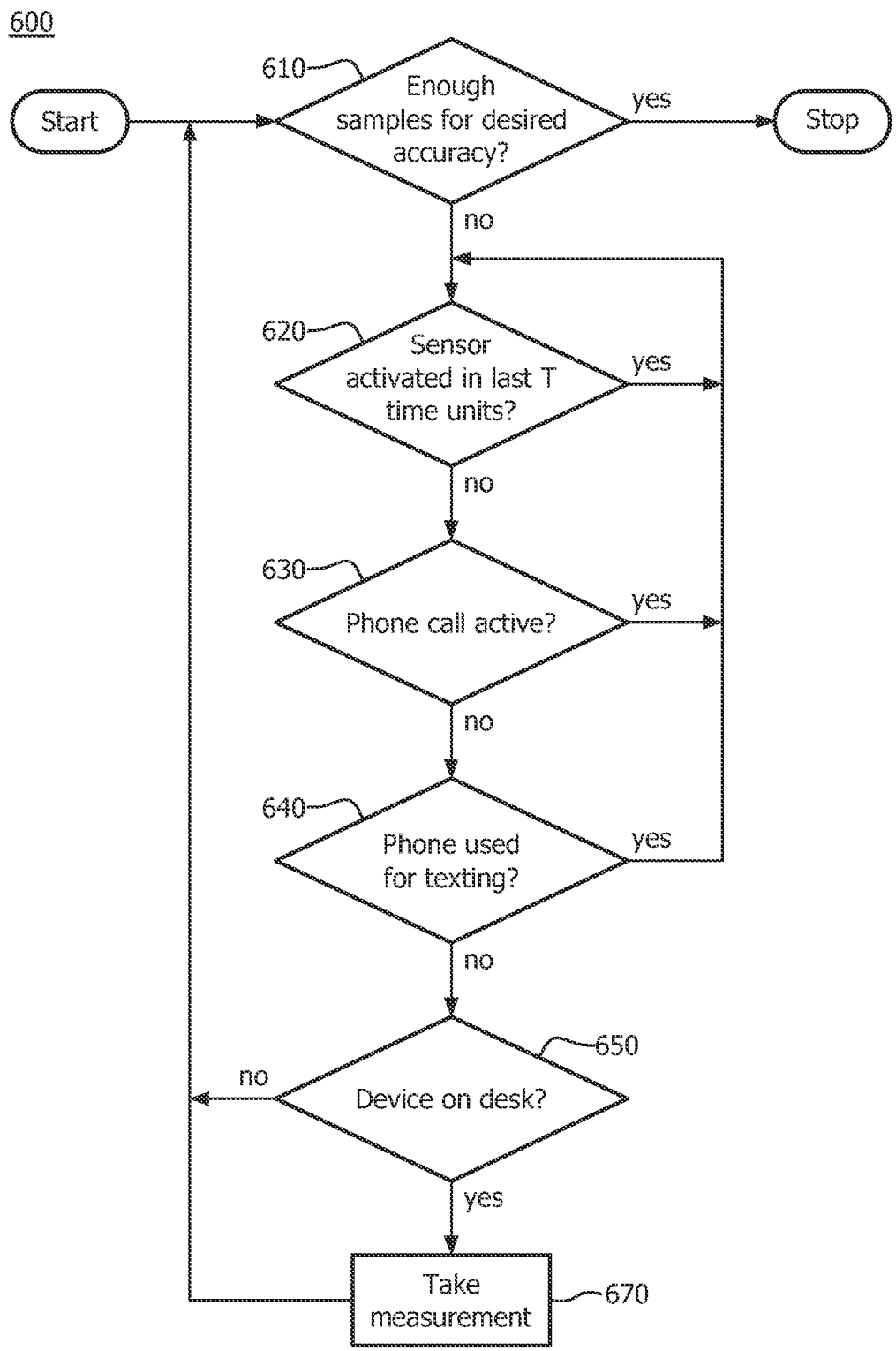
FIG. 5 illustrates an exemplary process flow in accordance with the principles of the invention.

Another consideration in the activation of sensors is their energy consumption, which would consume the battery life of the device at a rate proportional to the rate at which measurements are taken. The system enables the user to set the rate (1/T), and the sensor's sampling rate will not exceed this limit in order to manage the battery life. See FIG. 5 for a flow-chart depicting the method for sensor-activation:

FIG. 5 illustrates a flowchart 600 of an exemplary process for crowd sourcing data collection in accordance with the principles of the invention.

In this exemplary aspect of the invention, a user device (e.g., a smart phone) may take a number of samples of the environment in which the user device is located. For example, the device may take one or more samples of a lighting condition or a temperature within a known time period. The samples may be provided to the CPU 502 (FIG. 4) at a known rate or may be accumulated in the user device and then provided to the CPU 502 at a known rate. For example, the samples may be collected for a first period of time, summarized for the first period of time, and then provided to the CPU 502. Alternatively, data may be collected for a number of consecutive first periods of time and after a predetermined number of consecutive first periods of time have expired, the summarized values for each of the first periods of time may be reported. Alternatively, the CPU 502 may poll the device and the device may then provide the requested data to the CPU 502. Again the provided data may be a single sample (taken at the time of the polling or previously collected), a number of individual samples taken during a previous time period or a summation of a number of individual samples taken during a previous time period.

At block 610, a determination is made whether enough samples have been collected. For example, this determination may be based on the expiration of a first period of time, or a predetermined number of first periods of time, as discussed above.

If enough samples have not been collected, then at block 620, a determination is made whether the sensor within the user device has been activated within a predetermined time period. That is, has a sufficient time expired before taking a next sample is taken? If so, then processing waits until sufficient time has expired. For example, if samples have been provided during a recent time period and insufficient time has elapsed since a next request for sample, then a sample is not taken or provided.

When the time has expired, a determination is made whether a phone call is currently active at block 630. If so, then processing continues at block 620.

Otherwise, processing continues at block 640 to determine whether the user device is otherwise occupied or busy (e.g., being used for texting or similar communication). If yes, then processing returns of block 620.

Otherwise, processing continues at block 650 to determine whether the user device is in an idle condition (e.g., resting on a desk, not being held, etc.). If the device is an idle condition (or in a condition deemed to be sufficient to obtain a clean measurement), then a measurement is taken.

Otherwise, processing continues at block 610 to determine whether a sufficient number of samples have been collected or whether a time for transmission has expired.

When a time for transmission as expired or a request for a sample has been received, then the mobile device provides the individually collected samples or a summation of the individually collected samples to the CPU 502.

Figure 6:
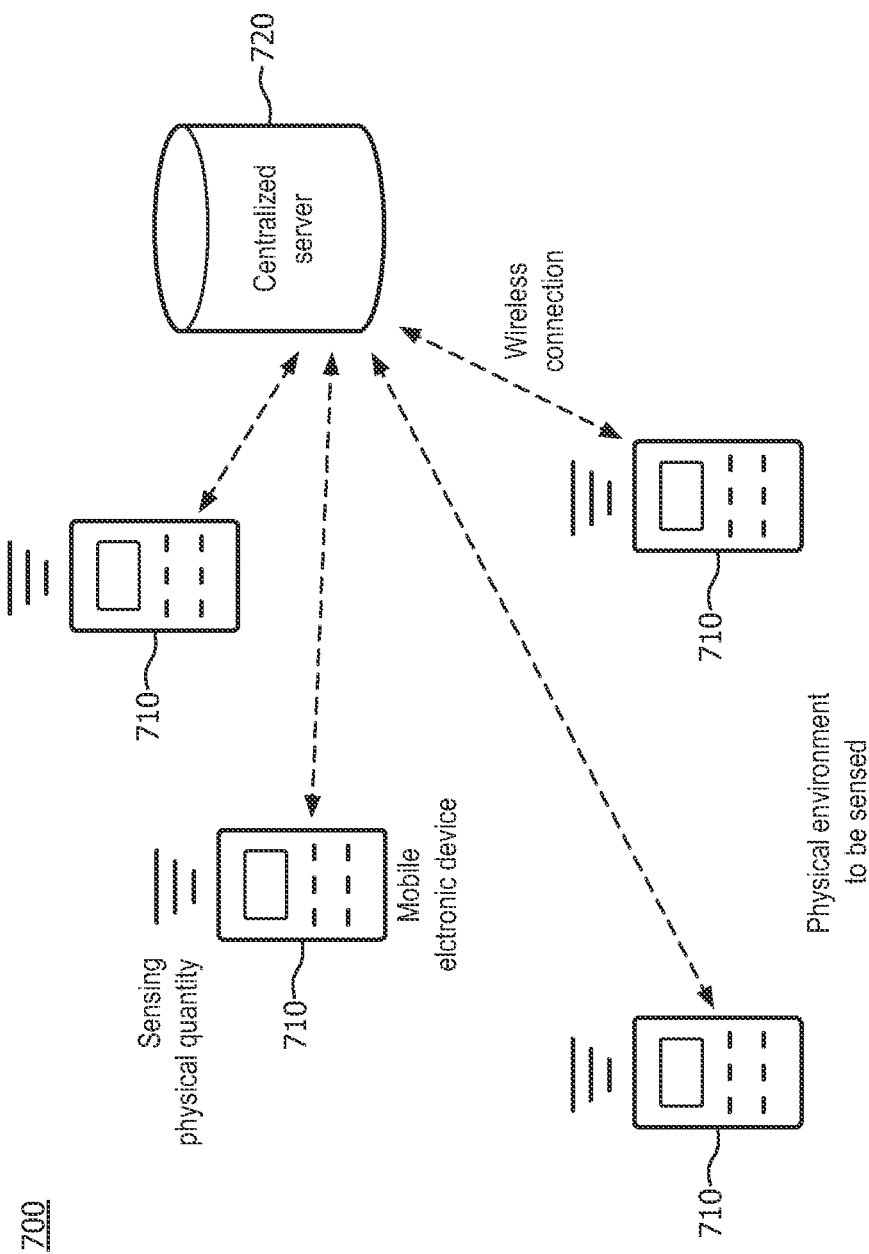
FIG. 6 illustrates a block diagram of an exemplary embodiment of the system in accordance with the principles of the invention.

FIG. 6 illustrates an exemplary system including a plurality of mobile devices 710 that include sensing elements suitable for obtaining samples from one or more of a temperature and a lighting condition. Each of the mobile devices provides the collected information regarding one or more collected sampled values associated with the sensed temperature or lighting condition to a centralized server 720. Centralized server 720 may represent CPU 502 shown in FIG. 4.

Using the collected data, the CPU or server 720 may create a spatio-temporal map of the physical quantities of interest. In one embodiment, the physical quantities of interest will include temperature and/or lighting. To create this map, let the function $T(x, t)$ denote the temperature T at a physical location x (expressed in a suitable coordinate system) at time t. Let the samples collected by the different users (and stored in the central server), be of the form $(x_1, t_1, T\_n) \ldots (x_n, t_n, T\_n)$.

To create a complete description of the function $T(x, t)$, statistical estimation (such as regression) and interpolation may be employed. In one embodiment, the temperature map $T(x, t)$ will be constructed as:

collect the K most recent samples obtained within S square feet of the point of interest (K and S being predefined parameters), and set the estimate of $T(x, t)$ to be the average temperature of these samples.

In another embodiment, statistical estimation techniques will also be used to determine the empirical variance and confidence intervals of the estimate obtained. In, regions where the empirical variance is found to be very large, the centralized system 720 may recommend the users collect additional samples which can then incorporated into the estimation to reduce the variance.

In one embodiment of the invention where illumination and temperature are among the physical quantities that are measured, one application of a spatio-temporal map formed by the collected samples will be determining whether a newly installed lighting and HVAC system meets specified user-comfort requirements expressed in the form of minimum and maximum levels of temperature and illumination. Using the temperature function $T(x, t)$ (or the similarly constructed $I(x, t)$ for the illumination function) estimated from the data, these specifications may be violated, and, hence, a warning message may be issued by the central serve 720 indicating the time and location of the violation. In a related application of the temperature and illumination functions, when either quantity reaches extremely low values, a warning flag may be issued by the centralized server 720 indicating a fault in the system along with time and location of the fault. In addition possible recommendations as to which lighting/HVAC fixture(s) may be in need of maintenance.

In one embodiment, the centralized server 720 may trigger commands and/or recommendations of various types to users/facility managers. These commands and/or recommendations may include information about where and when more data needs to be collected. The centralized server 720 may determine the changes to the information collection based on an analysis of the confidence interval estimated by the collected samples, using statistical estimation techniques. When the confidence interval is found to be unacceptable, the centralized server 720 may trigger messages to all users and/or only those who are in the vicinity of the space, (using an indoor locating system) and request additional samples.

One application of the system may be in providing analytics regarding physical quantities such as temperature and/or illumination in different parts of a space. In one embodiment, the invention may be used in commercial spaces, such as offices, to determine those regions that enjoy the warmest temperatures or the brightest illumination. This may be useful in allocation of work-spaces to different occupants of the building to match user preferences with realized temperature/illumination.

In one embodiment of the system, the users may be rewarded for participation in the data collection program. The rewards (either in the form of non-monetary "points", or in the form of monetary awards) can vary. In some embodiments fixed monetary awards may be made on a per sample basis, or at a flat rate on a monthly basis. In yet other embodiments the award of non-monetary points may be made to each user, followed by a "competition" wherein monetary awards may be given to users who collect the most points. The points awarded to users may be made dependent on a number of factors such as how many samples were collected, the quality of the samples obtained, and the relevance of the samples (samples being collected in more important areas or where no samples are available being awarded more points).

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Furthermore, a computer, a processor and/or dedicated hardware/software are described herein as being capable of performing the processing described herein, and it would be recognized that a computer, a processor and/or dedicated hardware/software are well-known elements in the art of signal processing and, thus, a detailed description of the elements of the processor need not provided in order for one skilled in the art to practice the invention described, herein.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A system for maintaining a building system configuration to provide desired building system performance, said system comprising:
    a processor in communication with a memory, the memory including code, which when accessed by the processor causes the processor to:
    receive sensor data from at least one sensor unit, wherein at least one of said at least one sensor unit is a mobile device; wherein said sensor data relates to one or more environmental conditions, and wherein at least some of said sensor data is from a sensor device contained in the at least one mobile device;
    determine a location associated with each of said at least one sensor unit;
    generate a map of an environment associated with said building system based on said received sensor data, wherein the environment comprises light and temperature conditions;
    detect a change in said map of said environment;
    determine, using an inference engine and without user intervention, a change in at least one commissioning parameter of said building system associated with said detected change in said map; and
    output said change in said at least one commissioning parameter to at least one system device that is capable of affecting at least one of said environmental conditions, to thereby maintain desired building system performance, to include at least one of temperature and lighting conditions.

2. The system of claim 1, wherein said processor further: storing said receiving sensor data; and correlating said received sensor data with corresponding stored sensor data.

3. The system of claim 1, wherein said sensor data is received through a network.

4. The system of claim 3, wherein said network is at least one of: a wired network and a wireless network.

5. The system of claim 4, wherein said mobile device is one of: a cellular phone, a smart phone, a PDA, a laptop, and a tablet.

6. The system of claim 5, wherein said mobile device determines a time for providing said sensor data.

7. The system of claim 1, wherein said processor is further configured for:
    polling at least one of said at least one sensor units for said sensor data.

8. The system of claim 1, wherein said change in said map is based on difference between a current sensor data and a history of said received sensor data.

9. The system of claim 1, wherein said change in said map of said environment is determined based on said change being greater than a threshold value, said threshold value being set for each type of sensor data.

10. The system of claim 9, wherein said threshold is based on at least one of: a user input and a number of times said change is detected.

11. A method, operable in a processor, for maintaining a building system configuration to provide desired building system performance, said method comprising:
receiving sensor data from at least one sensor unit, wherein at least one of said at least one sensor unit is a mobile device; wherein said sensor data relates to one or more environmental conditions, and wherein at least some of said sensor data is from a sensor device contained in the at least one mobile device;
determining a location associated with each of said at least one sensor unit;
generating a map of an environment associated with said building system based on said received sensor data, wherein the environment comprises light and temperature conditions;
detecting a change in said map of said environment;
determining, using an inference engine and without user intervention, a change in at least one commissioning parameter of said building system associated with said detected change in said map; and
outputting said change in said at least one commissioning parameter to at least one system device that is capable of affecting at least one of said environmental conditions, to thereby maintain desired building system performance, to include at least one of temperature and lighting conditions.

12. The method of claim 11, wherein said change in said map is based on a difference between a current sensor data and a history of received sensor data.

13. The method of claim 11, wherein said sensor input data is associated with at least one of: a temperature and an illuminance.

14. The method of claim 11, wherein said change in said map of said environment is determined based on said change being greater than a threshold value, said threshold value being set for each type of sensor data.

15. The method of claim 14, wherein said threshold is based on at least one of: a user input and a number of times said change is detected.

16. The method of claim 11, wherein the step of receiving sensor data comprises receiving data from a polarity of individuals, each having in his possession a sensor device contained in a mobile device.

17. The method of claim 16, further comprises providing recommendations as to where and when additional sensor data needs to be collected.

18. The method of claim 16 wherein the individuals are provided incentives for their participation in obtaining data.

* * * * *